Figure 1:
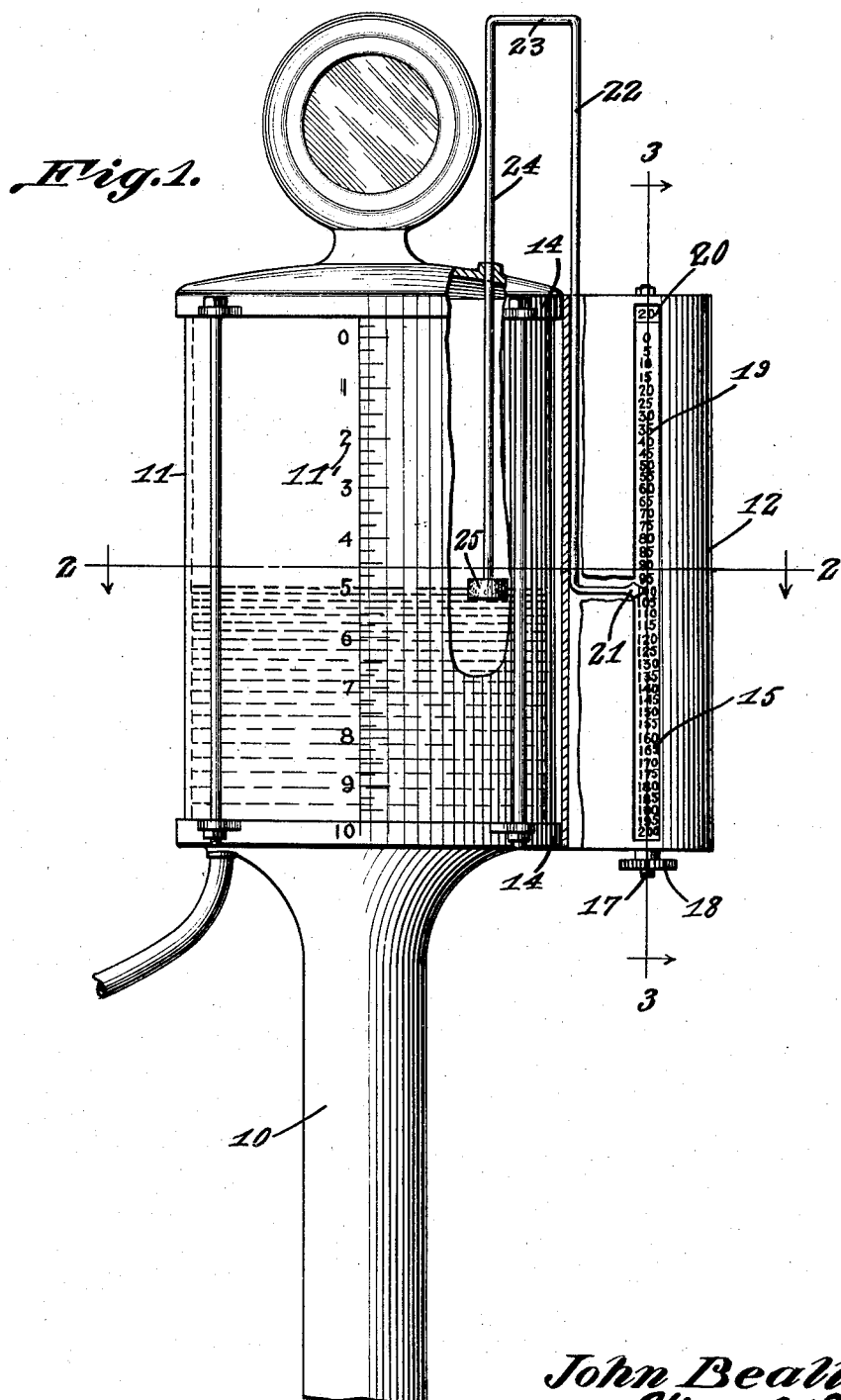

June 30, 1931. J. BEALL 1,812,676
COMPUTING ATTACHMENT FOR LIQUID DISPENSING DEVICES
Filed Jan. 23, 1928   2 Sheets-Sheet 1

John Beall, INVENTOR
BY Victor J. Evans
ATTORNEY

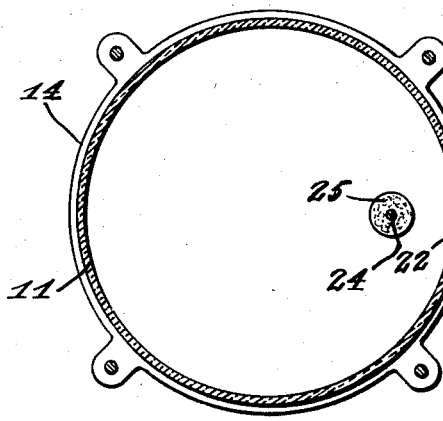
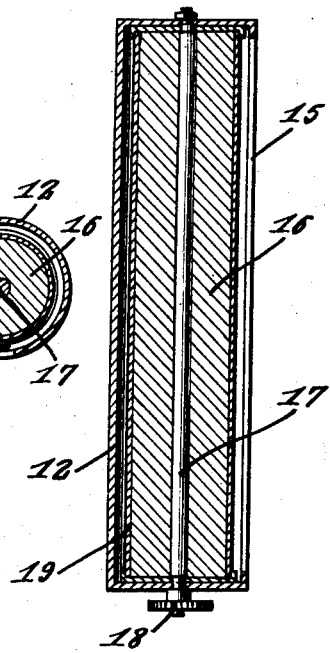

Patented June 30, 1931

1,812,676

UNITED STATES PATENT OFFICE

JOHN BEALL, OF CALDWELL, IDAHO

COMPUTING ATTACHMENT FOR LIQUID DISPENSING DEVICES

Application filed January 23, 1928. Serial No. 248,883.

This invention relates to improvements in liquid dispensing apparatus of the character employed for the sale of gasoline at automobile service stations, an object being to provide means controlled by the amount of liquid dispensed, to indicate the cost of the liquid at a given price, so that the attendant will not be required to compute the amount of the sale.

Another object of the invention is the provision of means of the above character which will permit of the liquid being sold in quantities called for in dollars and cents, instead of gallons or quarts, so that a customer may for example, ask for a dollar's worth of gasoline instead of five gallons at one dollar and ten cents. This speeds up service, as the customer is not obliged to wait for change and thus prevent another customer from reaching a gasoline pump.

Another object of the invention is the provision of means of the above character which are simple in construction, reliable in operation, and may be attached to any dispensing pump.

With the above and other objects in view, the invention further includes the following novel features and details of construcion, to be hereinafter more fully described, illustrated in the accompanying drawings and pointed out in the appended claim.

In the drawings:—

Figure 1 is an elevation of the upper portion of a gasoline dispensing pump with the invention applied, parts being broken away.

Figures 2 and 3 are sectional views taken respectively on the lines 2—2 and 3—3 of Figure 1.

Figure 4 is a view of the cost sheet.

Referring to the drawings in detail wherein like characters of reference denote corresponding parts, the reference character 10 indicates the standard of a gasoline dispensing pump which is provided with a tank 11, the walls of which are transparent. As is usual in tanks of this character there is provided a scale 11' which indicates the amount of liquid within the tank.

The invention includes a casing 12 which is shown as cylindrical and which is provided with upper and lower apertured ears 13 so that the casing may be attached to the flanges 14 at the top and bottom of the tank 11. The casing 12 is provided with a vertically arranged sight opening 15.

Located within the casing 12 is a cylinder 16. This cylinder is mounted for rotation upon a shaft 17 which has bearings in the top and bottom of the casing 12. The cylinder is fast upon the shaft 17 and the latter has mounted upon its outer end a preferably knurled disk 18, whereby the cylinder may be conveniently rotated. Mounted upon the cylinder is a cost sheet 19, which, as shown in Figure 4 of the drawings, is provided along its upper edge with numerals 20 which indicate the cost per gallon of gasoline within the tank 11. Of course these numerals may be varied to indicate the price in pints, quarts, gallons, etc. of any other liquid. Arranged beneath the numerals 20 in vertical rows are numbers indicating the total cost of the amount of liquid dispensed, the cost being determined by means of a pointer 21 which is carried at the lower end of one arm 22 of an inverted substantially U-shaped member 23. This arm 22 extends downward through the top of the casing 12 and the pointer 21 is curved in conformity with the space between the casing and the cylinder 16. The other arm 24 of the U-shaped member 23 is provided with a float 25, so that the position of the pointer will be regulated by the amount of liquid within the tank 11.

Any of the rows of numbers upon the sheet 19 may be positioned within the sight opening, the particular row exposed being governed by the price of the liquid within the tank. For example, if gasoline is selling at twenty cents per gallon, the vertical row of numbers having twenty at the top will be arranged within the opening 15 as shown in Figure 1 of the drawings. Should a purchaser desire one dollar's worth of gasoline, gasoline will be permitted to flow from the tank 10 until the pointer 21 reaches one dollar upon the cost sheet. The outflow of gasoline will then be stopped and it will be seen by reference to the scale 11' that five gallons of gasoline have been sold. On the other hand, should a customer purchase five gallons of gasoline, the liquid will be dispensed until it reaches the five gallon mark on the scale 11'. The pointer 21 will then point to one dollar on the cost sheet, so that the attendant will at once know the price of the gasoline sold.

Should the price of gasoline be twenty-two cents per gallon and the customer desires to purchase one dollar's worth of gasoline, gasoline is dispensed from the tank 10 until the pointer reaches the one dollar mark, the cylinder 16 having previously been positioned to bring the proper column of figures within the opening 15.

The invention is susceptible of various changes in its form, proportions and minor details of construction and the right is herein reserved to make such changes as properly fall within the scope of the appended claim.

Having described the invention what is claimed is:—

In combination with a transparent fluid dispensing receptacle provided with an opening in the upper end and a scale to indicate the amount of fluid therein and a support for said receptacle, a cylindrical casing secured to the support and extending parallel with the receptacle and having a sight opening arranged parallel with the scale, a cost computing drum journaled in the casing and having certain indicia thereof readable through the sight opening, a substantially U-shaped member including spaced parallel arms and having one arm extending into the receptacle by way of the opening therein and the other arm extending into the casing, a pointer carried by the arm extending into the casing and viewable through the sight opening, and a float carried by the arm in the receptacle to move the pointer over the indicia of the drum in rear of the sight opening in accordance with the level of the fluid in the receptacle.

In testimony whereof I affix my signature.

JOHN BEALL.